Patented Nov. 18, 1924.

1,515,653

UNITED STATES PATENT OFFICE.

AXEL E. BERTELSON, OF NEW YORK, N. Y.

GLASS SPONGE AND PROCESS OF MAKING SAME.

No Drawing.     Application filed November 7, 1923.   Serial No. 673,372.

*To all whom it may concern:*

Be it known that I, AXEL E. BERTELSON, a citizen of United States, residing at New York, in the county of New York and State of New York, have invented new and useful Improvements in Glass Sponge and Processes of Making Same, of which the following is a specification.

The object of the present invention is the production of a product which shall have more or less of the structural characteristics of a sponge, but which will be made out of glass, whereby a novel useful article is produced.

In accordance with the present invention, a quantity of glass or glass-like substance, in the form of mineral wool, glass wool or the like, is mixed with a considerably larger amount of an inert material which is soluble under some conditions, and which is capable of being heated up to a temperature sufficiently high to cause the glass to fuse or partially fuse, whereby the particles of glass, fuse themselves together at such points as they touch each other, it being understood that the inert material is one which is inert not only at ordinary temperature, but at temperatures even up to the melting point of glass.

The product thereby produced, is then cooled off, and this cooling is preferably conducted slowly in order that the product shall anneal itself, after which the inert material is removed from the mass, by solution in an appropriate solvent. The glass used may be a common grade of glass, such as window glass, having a relatively low fusing point. The salt used should have a high melting point, and as above stated, should not fuse below the melting point of glass, and should not act chemically upon the glass, or else should not act chemically on the glass to any very substantial extent. For ordinary glass, sodium chloride or cuprous sulfide can be used as the inert material, these being used, for instance, in a fine granular condition. Without limiting myself to proportions, it is stated that one part of the glass wool may be used with 20 parts of the inert material. The inert material, as above stated, should be soluble in some appropriate solvent, and may be soluble in water or in hydrochloric acid or other solvent, such solvent of course, being one which does not act chemically upon glass.

The function of the inert material, is to hold the glass fibres in place, while the glass is being fused or partially fused, so that the entire mass of glass fibres does not collapse into the form of a lump.

If the inert material used is a salt which has water of crystallization, this latter should preferably be driven off before using the salt in the process of the present case.

It will be obvious that the uniformity of texture of the sponge will be greater, the more intimate the mixing of the glass wool or similar materials with the salt or other inert material. Ordinarily it is preferred to mix these two materials very thoroughly, in order to produce a sponge having a uniformity throughout. In other cases, however, it may be advisable not to mix this material together too completely, in order to produce a sponge having some parts more open and other parts more filled.

It will be understood that the glass can be made of a desired color, or combination of colors, to meet particular requirements.

The salt or other inert material, leached out can in some cases, be recovered from the solution for reuse in the process. This would be entirely feasible in the case of sodium chlorid above mentioned.

I claim:

1. A process of making glass structure, which comprises intermingling material having the general properties of glass, in the form of long fine strips, with material which at the melting point of glass is inert thereto and which latter material is capable of solution in a reagent which is substantially inert to glass, heating the mixture sufficiently to at least partially fuse the glass-like material, whereby the long fine strips sinter themselves into a sponge-like structure, cooling, and thereafter leaching out said inert material.

2. A process of making a sponge-like product which comprises mixing glass wool with a salt which is substantially inert to glass, heating sufficiently to sinter the glass, cooling and leaching out the salt.

3. A sponge like structure composed of a mass of numerous filamentous pieces of glass, sintered together at the points of contact with each other.

In testimony whereof I affix my signature.

AXEL E. BERTELSON.